March 18, 1969  R. O. FIELD ET AL  3,433,526
HEADLINING RETAINER
Filed Nov. 24, 1967
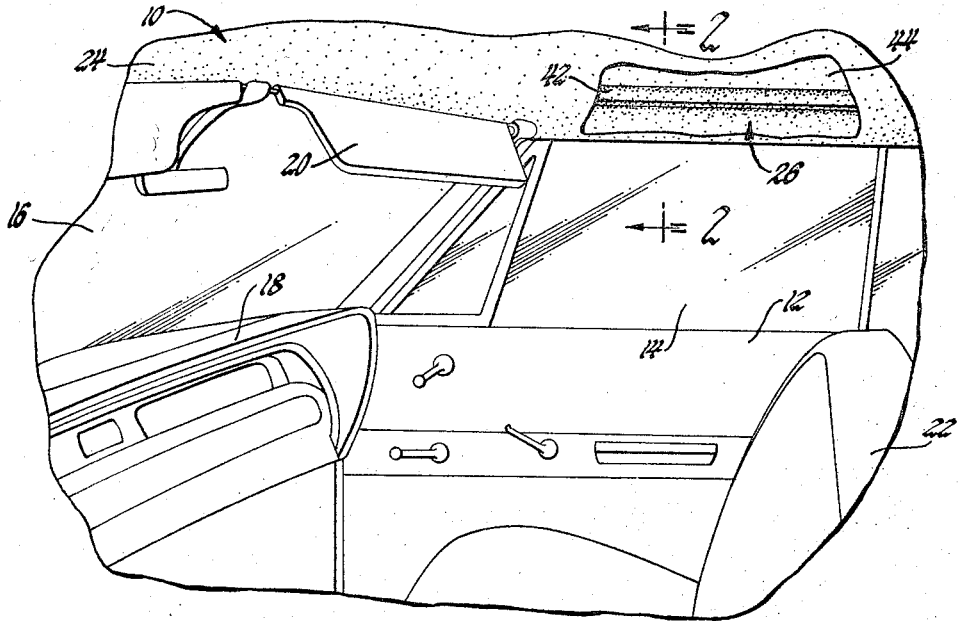
Fig. 1
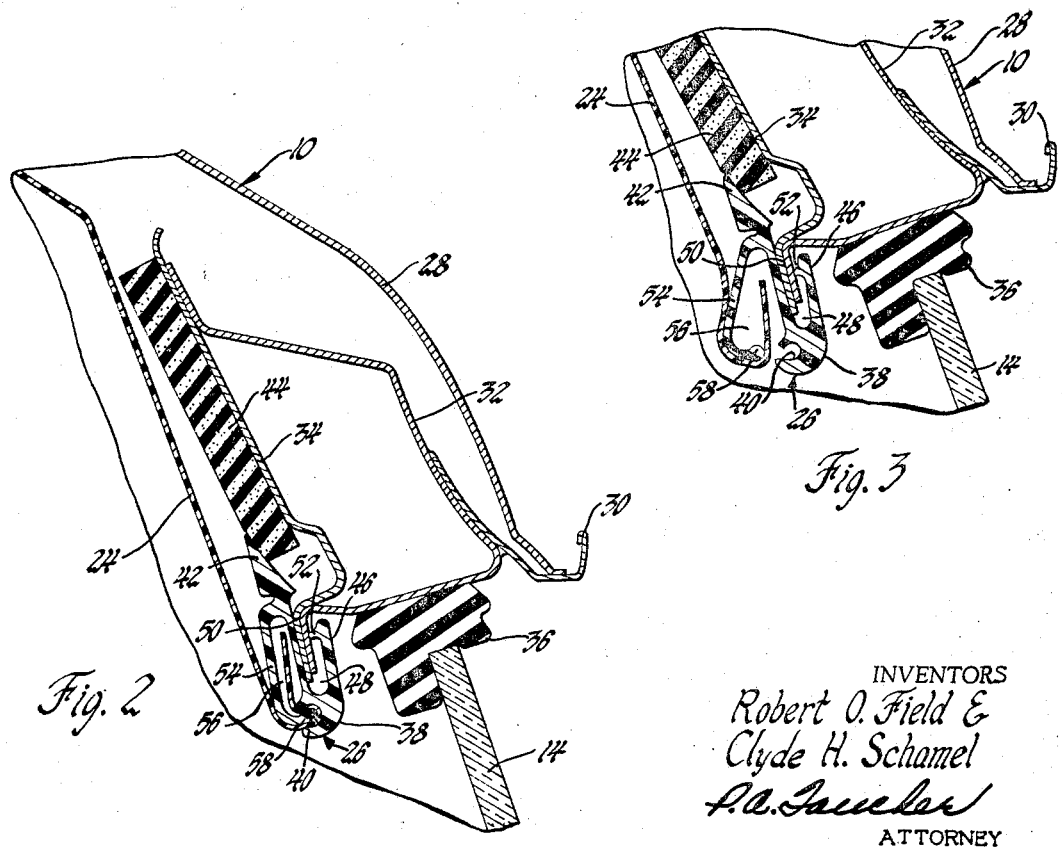
Fig. 2
Fig. 3
INVENTORS
Robert O. Field &
Clyde H. Schamel
ATTORNEY

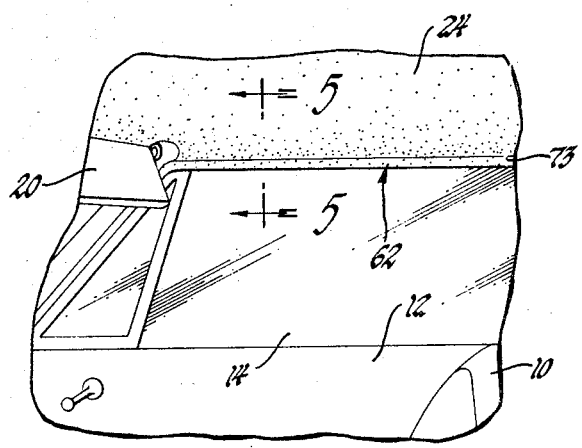
Fig. 4
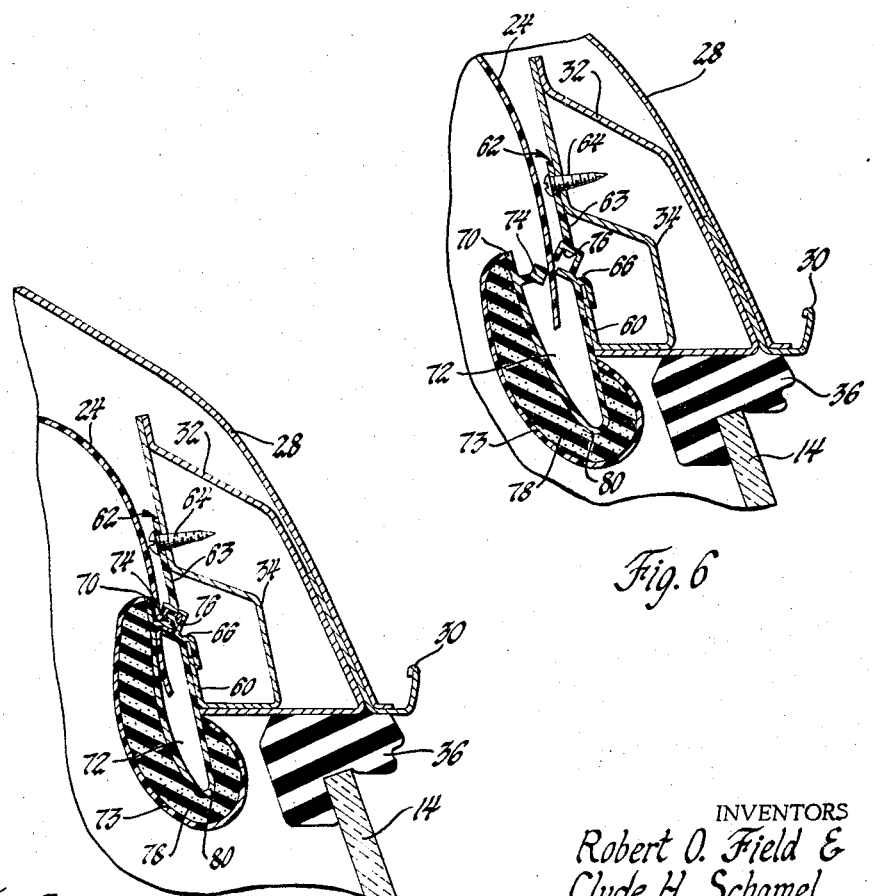
Fig. 5
Fig. 6
INVENTORS
Robert O. Field &
Clyde H. Schamel
P. A. Taucher
ATTORNEY 3,433,526
HEADLINING RETAINER
Robert O. Field, Bloomfield Hills, and Clyde H. Schamel, Royal Oak, Mich., assignors to General Motors Corporation, Detroit, Mich., a corporation of Delaware
Filed Nov. 24, 1967, Ser. No. 685,529
U.S. Cl. 296—137
Int. Cl. B62d 25/06
3 Claims

ABSTRACT OF THE DISCLOSURE

The invention relates to a continuously formed vehicle headliner retainer clip made of flexible material such as plastic, or the like, which clip incorporates a continuous head and groove arrangement for retaining the headliner and, in addition, includes a means of retaining padding material within the interior of the vehicle as a safety feature.

---

The prior art generally discloses separate individual clips made of metal, as for instance the clips disclosed in the U.S. patent to Bull et al. No. 3,294,436, or to the metal retaining means as shown in the U.S. patent to Sturtevant et al. No. 3,195,948. Both of the above references disclose pronged clip means made of metal, wherein neither provide for the retention of cushioning, padding material.

The present invention generally relates to headlining retaining clips and, more specifically, to a headlining retaining clip or fastener which is formed of a continuous non-metal and flexible material, such as plastic, rubber, or the like, and which can be shaped to the contours on the interior of the body along the roof line to grip and lock the interior roof trim, commonly known as a headliner, at the roof line. There is incorporated a means of holding concealed safety padding, as well as a novel continuous head and groove locking arrangement, which head and groove insures a positive gripping and locking of the headliner and provides a neat interior appearance.

It is an object of the present invention to provide an elongated continuously formed flexible means for retaining the headlining of the vehicle made of non-metal material which can be easily shaped, and thereby conform, to the contour of the vehicle interior and can be cut to any desired length.

It is another object of the present invention to provide a headliner retaining means which incorporates a means for holding concealed padding material.

It is another object of the present invention to provide a headliner retaining means which incorporates a support member for holding concealed padding material.

It is still another object of this invention to provide a retaining means which incorporates padding material wherein said retaining means also serves as trim on the interior of the vehicle.

It is a further object of the invention to provide a retaining means that has a novel head and groove arrangement for gripping and locking the headliner in position along the interior roof line of a vehicle.

These and other features of the invention will be readily apparent from the following specification and drawings wherein:

FIGURE 1 is a partial side elevation of a vehicle body interior employing a trim and molding arrangement according to this invention;

FIGURE 2 is an enlarged sectional view taken along the plane indicated by line 2—2 of FIGURE 1 and which shows the fastener in the closed and locked position;

FIGURE 3 is the sectional view taken generallly along the plane indicated by line 2—2 of FIGURE 1 and which shows the fastener in the unlocked or open position;

FIGURE 4 is a partial side elevation of a vehicle body interior employing a trim and molding arrangement according to a second embodiment of this invention;

FIGURE 5 is a sectional view taken generally along the plane indicated by line 5—5 of FIGURE 4 and shows the fastener in a closed and locked position; and FIGURE 6 is a sectional view of the fastener in the open or unlocked position.

FIGURE 1 illustrates the interior of a vehicle body with fastener 26 shown in FIGURE 2 in place along the roof line generally designated as 10 and, for orientation purposes, includes a front door 12, side window 14, front window 16, dash 18, visors 20, seat member 22 and headliner 24, formed of a relatively thin sheet material, to which the fastener 26 specifically pertains.

FIGURE 2, taken through line 2—2 of FIGURE 1, shows a roof member 28 of the vehicle to which is attached gutter 30 and an outer roof rail 32 and inner roof rail 34. Attached to the outer roof rail by suitable means such as an epoxy adhesive, or the like, is a weather strip 36 made of rubber, or the like, which in addition to being a weather stripping retains the window 14 in a tight closed position.

Fastener member 26 illustrated in FIGURE 3 comprises a continuous body portion 38 having a generally horseshoe-shaped groove 40 at one end and a flexible finger-like member 42 at the opposite end which is triangular in shape as illustrated, but may be ball-shaped, elongated in shape with holding serrations thereon, or the like. When fastener 26 is mounted on the roof rails, member 42 forms a pocket or channel between itself and inner roof rail 34 and serves as a means of retaining additional padding material 44 within the pocket formed by member 42 and the inner roof rail 34. Padding material 44 may be made of foam rubber, or the like; and, as shown, the material is behind and concealed by the headliner 24. Member 42 is integral with body member 38 of fastener member 26 and is made of the same flexible non-metal material, such as plastic, rubber, or the like.

Integral with body 38 is a leg-like member 46 forming a channel or pocket 48 between itself and the body member 38, wherein the channel or pocket 48 is adapted to receive the turned down inner and outer roof rail flanges 50. Finger or bight portion 52 on member 46 holds the fastener on the interior of the vehicle body. It is understood that some other holding means other than member 46 having bight 52 thereon, for example epoxy adhesives, or the use of screws or rivets, or the like, may also be used. A continuous second-leg-like member 54 is formed integral with member 38, adjacent member 42, generally depending in an opposite direction from that of member 46, and is adapted to form a channel or pocket 56 between itself and body member 38. Member 54 has at its free end a head 58 which mates with the generally horseshoe-shaped groove 40 and is generally circular in configuration. However, any shape of head and groove may be used, as long as they mate and lock upon engagement.

In assembly, headliner 24 is wrapped around head 58 and is pulled into channel 56 formed by leg 54 and body 38, with the additional overage material, if any, being place or taken up within the channel or pocket 56. Headliner 24 is then stretched in a neat and tight arrangement within the vehicle body, thereby concealing the roof and providing a neat interior trim. Head 58 on the free end of member 54 is pushed into engagement with groove 40; and, because of the respective shapes of groove 40 and head 58, they are locked in mating engagement, thereby retaining the headliner. Headliner 24 is not pierced or punctured by head 58 but conforms to the mated shape of the head and groove and is locked or gripped in this assembled position. This locked assembly is shown in FIGURE 2. Prior to assembly of the headliner 24, additional padding material 44 may be inserted along the inner roof rail 34 to be held by finger member 42 against roof rail 34 and within and concealed by headliner 24 as an added interior safety feature of the vehicle.

In the second embodiment, fastener member 62 is also formed of a continuous non-metal flexible material such as plastic, or the like, and is attached to the inner roof rail 34 by some appropriate means such as epoxy adhesives, integrally formed flanges, rivets, screws, as shown at 64 and 66, or the like. Body member 63 of fastener 62 has an integral upturned free leg-like member 70 at the end opposite the point of attachment to roof rail 34, wherein member 70 is adapted to form a channel or pocket 72 between itself and body member 63. In addition, member 70 has a head 74 at the free end thereof for mating engagement with a groove 76 formed in body 63. Groove 76 is integral with and is formed in the body 63 of the fastener 62 and, as shown, is diamond in shape. However, any suitably shaped head and mating groove may be sued, as long as they remain in a mated closed position upon closure.

As in the previous embodiment, to assemble headliner 24 within the vehicle, the headliner is stretched in a neat and tight manner, the end thereof and any excess being placed in channel or pocket 72. The head 74 on the free end of leg 70, which leg pivots about the point 80, is pushed or urged into engagement with groove 76. Upon mating with groove 76, headliner 24 and head 74 are held in locked engagement within groove 76. As in the previous embodiment, headliner 24 is not pierced or punctured by head 74, but rather conforms to the mated shape of the head and groove. This feature provides a stronger arrangement since the headliner is not initially pierced, thereby precluding weak spots and the possibility of further tearing or ripping along the pierced portions.

The fastener trim or covering material 73 and leg 70 serve as a means of holding additional padding material 78 on the interior of the vehicle. The padding material 78 may be made of foam rubber, or the like, and, as shown, is behind and concealed by the fastener trim or covering material 73.

As an optional or additional feature of attachment which acts in combination with screw 64, fastener member 62 may have thereon flanges 66 which engage flange 60 on inner roof rail 34.

We claim:
1. A continuous elongated flexible fastener strip in combination with a vehicle body for retaining the vehicle headliner and adapted to hold additional safety padding material within the vehicle body wherein said fastener comprises:
   a body having locking groove means adjacent one end thereof;
   a flexible member spaced from said body to define a pocket receptive of the vehicle headliner and having a head means for engagement with the groove in said body, whereby upon said headliner being placed over said head means and into the defined pocket, said head means and headliner are engaged in the groove within said body, thereby retaining said headliner in a locked position between said head and groove in said body;
   said groove in said body and said head being coextensive with said fastener strip, with said fastener strip being adapted to be attached to said vehicle body; and
   means on said body adjacent said flexible member adapted to hold the additional safety padding material.

2. A continuous elongated fastener in combination with the inner and outer flanged roof rail of a vehicle body for retaining the vehicle headliner and additional safety padding material, wherein said fastener comprises:
   a body having a locking groove therein adjacent one end;
   a first flexible member integral with and in spaced relationship to one side of said body defining a first pocket receptive of the inner and outer flanged roof rail, adapted to retain said fastener on said flanges;
   a second flexible member integral with said body and having a head thereon for mating engagement with the groove in said body, wherein said second flexible member and body defines a second pocket receptive of the vehicle headliner, whereby upon the headliner being placed over said flexible member and head thereon, and into the second pocket defined by the flexible member and body, said head and groove are mated together thereby retaining said headliner in a locked position between said head and groove in said body; and
   a third flexible member adjacent said second flexible member, on said body at the end opposite from said first flexible member defining a third pocket between said third flexible member and said inner roof rail, receptive of padding, which padding is concealed by said headliner.

3. A continuous headliner and safety padding retainer fastener in combination with vehicle roof rails wherein said fastener comprises:
   a body adapted to be attached to said roof rails, having a locking groove therein adjacent one end;
   a flexible leg member integral with said body;
   said flexible leg member having a locking head thereon for engagement with said locking groove in said body wherein said headliner is held in position by engagement of said locking head and locking groove in said body; and
   holding means on said body being spaced apart from said flexible leg member and secured thereto at one end and to said body at the other end, for retaining said safety padding material therebetween.

References Cited

UNITED STATES PATENTS 3,083,048  3/1963  Kramer _____ 296—137

LEO FRAGLIA, *Primary Examiner.*

R. R. SONG, *Assistant Examiner.*